3,150,099
VITREOUS MATERIALS AND THEIR APPLICATION TO NUCLEAR REACTORS
André H. Pons, Bourg-la-Reine, France, assignor to Compagnie de Saint-Gobain, Paris, France
No Drawing. Filed Dec. 28, 1959, Ser. No. 862,061
Claims priority, application France Dec. 30, 1958
10 Claims. (Cl. 252—301.1)

The present invention relates to nuclear fuels which may be used in homogeneous reactors.

Nuclear fuels in the form of more or less spherical glass beads with a high content of uranium or any other fissionable or fertile element have been suggested for use in homogeneous type reactors. Such beads are maintained in suspension in a liquid like heavy water which serves the multiple purpose of slowing down the neutrons, cooling the reactor and evacuating the fission products.

The state of the surface of these "micro-beads" and their shape are effective in preventing the wear of the equipment and ducts in which they are made to travel. On the other hand, the vitreous material has also as a purpose to protect the nuclear matter which is embodied in it.

An object of the present invention is to provide glasses which will effectively lend themselves to the manufacture of nuclear fuels in the shape of uranium and/or thorium-containing micro-beads.

Another object of the present invention is to manufacture glasses as described above and which will contain no elements showing a large cross section with respect to neutrons.

A further object of this invention is to provide glasses as described above and which may be made into spherical beads with diameters measuring from several to 100 microns.

Yet another object of the present invention is to provide glasses as described above and which will be but little affected by heavy water at a temperature of 300° C.

Still a further object of this invention is to provide a method of processing and utilizing micro-beads made of glasses such as the ones described above, which method is useful in making these glasses even more resistant to attack.

Further objects will be apparent from the reading of the description which follows.

The components of the glasses which are made according to this invention are present in proportions comprised within the following limits (in percent by weight):

$SiO_2$ ----------------- 25 to 35%.
$TiO_2 + ZrO_2$ ---------- 10 to 25% of which 5 to 10% of $ZrO_2$.
$MO + ZnO + MgO + BeO$ -- 20 to 40% of which:
                              8 to 38% of MO.
                              0 to 15% of ZnO.
                              2 to 5% of MgO.
                              0 to 5% of BeO.
$UO_2$ and/or $ThO_2$ ------- 20 to 45%.
MO stands for one or more alkaline earth oxides.

Other oxides such as $Al_2O_3$ and $Fe_2O_3$ may be included in the glasses as impurities in the starting materials and these oxides will have no detrimental effect provided they are present in small amounts and as they show a small cross section to neutrons.

It has been observed that $TiO_2$ and $ZrO_2$ are not only instrumental in bringing about an improved resistance to attack of these glasses but also in promoting vitrification. The latter effect is unexpected in glasses which contain no alkali metal oxides. $ZrO_2$ improves the resistance to attack and should preferably be present in amounts of at least 5% by weight. The resistance to attack increases with the proportion of $ZrO_2$ but it becomes difficult to prevent devitrification when the $ZrO_2$ content gets to be higher than 10%. An optimum amount of $ZrO_2$ can therefore be set at about 7%.

As for the alkaline earths oxides, it has been observed that they can be replaced in part by BeO and ZnO with a resulting improvement of both resistance to attack and ease of melting. Higher proportions of these oxides than the ones indicated have detrimental effects, however.

The composition disclosed in the following example is a preferred embodiment of the invention.

*Example*

| | Percent by wt. |
|---|---|
| $SiO_2$ | 30 |
| $TiO_2$ | 7 |
| $ZrO_2$ | 7 |
| CaO | 12 |
| ZnO | 8.5 |
| MgO | 3 |
| BeO | 2.5 |
| $UO_2$ | 30 |

A glass having these proportions is not attacked by ordinary or heavy water. When 10 grams of this glass were converted into particles of 40 to 80 microns in size and exposed to an attack by water at 100° C. during 500 hours, the residue after evaporation amounted to only 5 mg.

In comparison, ordinary silico-sodo-calcic glasses such as window or bottle glasses, when converted into particles of 300 to 400 microns and exposed to a 5 hours attack by water at 100° C., left a residue of between 20 to 50 mg. for every 10 grams of treated glass and this despite the fact that the attack lasted 100 times less and that the particles were 5 to 10 times bigger than in the first case.

The attack on the preferred glass was still very slight at 300° C. After a 100 hour attack by water at 300° C., the glass being in particles of between 80 and 100 microns in size, the residue after evaporation of the water amounted to only 100 mg. It should be noted that an attack by heavy water will have very much the same effects. Therefore, a glass having such a composition is particularly well suited for use in the form of micro-beads in homogeneous reactors which contain heavy water and operate at high temperatures.

The resistance to attack of the subject glasses can be even more strongly increased by an appropriate treatment which consists in protecting the glass by a layer of insoluble silicate and, in particular, a light metal silicate in which the light metal has a valence of 2 or more such as, for instance, beryllium or magnesium.

Good results have been obtained by submitting the glass during 100 to 150 hours and at 100° C. to the action of a 100 g./l. magnesium chloride solution. A glass such as the one disclosed in the example, which was treated in this fashion and submitted to a 150 hours attack at 300° C., left a residue after evaporation of only 11 mg. instead of the previous 100 mg. Such an amount can be considered negligible.

The present invention also discloses methods for the use of the above-described glasses which methods will improve the resistance to attack of said glasses and may be applied in all cases where such a method does not interfere with the manufacture of the micro-beads destined to serve as nuclear fuels.

A first method of use consists in introducing a small amount of a magnesium or beryllium hydroxide or a magnesium or beryllium salt having little tendency toward hydrolysis into the water in which the glass is immersed. Hydrated magnesia of a 50 mg./litre concentration decreases the residue of an attack on the glass, performed under the same conditions as before, i.e., a water treatment of 150 hours at 300° C., lowering said residue from 100 mg. to 40 mg. The introduction of magnesia into the heavy water of a reactor does not interfere with the latter's proper functioning.

It is advisable to apply the method of the foregoing paragraph to a glass which has been pre-treated. For instance, the glass which is described in the example, if treated by magnesium chloride and attacked under the same conditions as above, i.e., by means of water containing 50 mg./litre of magnesium hydroxide during 150 hours at 300° C., leaves a residue of only 11 mg., which is practically negligible.

Another method of using the subject glasses calls for the introduction of silica gel into the water in which the glass is immersed. It has been found that there is an optimum silica concentration of about 170 mg./litre. When such a concentration is used in connection with the glass set forth in the example, the residue after an attack of 150 hours at 300° C. decreases from 170 mg. to 11 mg. The presence of a small amount of silicate in the heavy water of a reactor has no adverse effect upon the latter's functioning.

What has been said above concerns more particularly the use of the glasses according to the invention in conjunction with nuclear reactors because such a use appears to be the most promising one, but it should be understood that the invention relates to the glasses themselves whatever the use to which they may be put.

What is claimed is:

1. Glass consisting in its essential constituents, and having proportions by weight, of 25 to 35% silica; 10 to 25% of $TiO_2$ plus $ZrO_2$ of which 5 to 10% is $ZrO_2$; 20 to 40% of the group consisting of the alkaline earth oxides, ZnO, MgO and BeO of which 8 to 38% is alkaline earth oxide, 0 to 15% is ZnO, 2 to 5% is MgO, and 0 to 5% is BeO; and 20 to 45% of a group consisting of $UO_2$ and $ThO_2$.

2. Glass consisting in its essential constituents and proportions by weight of about 30% $SiO_2$, about 7% $TiO_2$, about 7% $ZrO_2$, about 12% CaO, about 8.5% ZnO, about 3% MgO, about 2.5% BeO, about 30% $UO_2$.

3. Glass according to claim 1 bearing upon its surface a protective layer of an insoluble silicate from the class consisting of the silicates of beryllium and magnesium.

4. Glass according to claim 1 bearing upon its surface a protective layer of a water-insoluble silicate of a light metal having a valence of 2 to 4.

5. Glass microbeads having diameters on the order of a few microns to about 100 microns, and having the composition of claim 1.

6. Glass microbeads according to claim 5 having a coating of a protective layer of a water-insoluble silicate of a light metal having a valence of 2 to 4.

7. A nuclear fuel being a suspension in water of glass microbeads having the composition of claim 1.

8. A nuclear fuel according to claim 7 in which the water contains a salt of one of the group consisting of Be and Mg which has a low rate of hydrolysis in water.

9. A nuclear fuel according to claim 7 in which the water contains silica gel.

10. A nuclear fuel according to claim 8 in which the salt is the hydroxide of one of the named metals.

References Cited in the file of this patent

UNITED STATES PATENTS

| | | |
|---|---|---|
| 2,315,328 | Hood et al. | Mar. 30, 1943 |
| 2,719,098 | Goldman | Sept. 27, 1955 |
| 2,859,138 | Melbourne | Nov. 4, 1958 |
| 2,901,365 | Seymour et al. | Aug. 25, 1959 |
| 2,902,377 | Duncan | Sept. 1, 1959 |
| 2,919,208 | Treat | Dec. 29, 1959 |
| 2,920,024 | Barton et al. | Jan. 5, 1960 |
| 2,922,725 | Kempen | Jan. 26, 1960 |

FOREIGN PATENTS

| | | |
|---|---|---|
| 1,033,807 | Germany | July 10, 1958 |

OTHER REFERENCES

Atomic Energy Documents: KAPL–1866, September 9, 1951, ORNL–2614, pp. 130–133, November 20, 1958.

"Second United Nations Conference on the Peaceful Uses of Atomic Energy," held in Geneva, September 1–September 13, 1958, vol. 7, pp. 544–547.